Nov. 9, 1926. 1,606,480

W. E. REILLY

MANIFOLD NUT CLAMP

Filed Sept. 6, 1923

Witness
Lynn Latta

Inventor
Walter E. Reilly
By Bair & Freeman
Attys

Patented Nov. 9, 1926.

1,606,480

UNITED STATES PATENT OFFICE.

WALTER E. REILLY, OF DES MOINES, IOWA, ASSIGNOR, BY DIRECT AND MESNE ASSIGNMENTS, TO HARRY L. DAVIDSON, OF DES MOINES, IOWA.

MANIFOLD NUT CLAMP.

Application filed September 6, 1923. Serial No. 661,205.

The object of my invention is to provide a nut clamp especially adapted for use in connection with a manifold and an exhaust pipe for holding the nut connecting the same together against any possible accidental loosening, the parts being very simple and capable of being easily manufactured for marketing the same at a comparatively low cost.

In this connection, it may be mentioned that a nut, sometimes called a packing nut, is used for connecting the exhaust manifold of an automobile to the exhaust pipe. The nut in a great many instances will become loose, due to vibration of the automobile, and it is quite difficult to tighten the nut when the exhaust manifold and the exhaust pipe are hot, and it is my object to provide a clamp which may be slipped onto the exhaust pipe and frictionally held there in such a manner that the projecting ears will engage some of the surfaces of the nut for preventing any possible rotation or loosening thereof accidentally.

With these and other objects in view, my invention consists in the construction, arrangement and combination of the various parts of my device, whereby the objects contemplated are attained, as hereinafter more fully set forth, pointed out in my claim, and illustrated in the accompanying drawings, in which:

Figure 1:
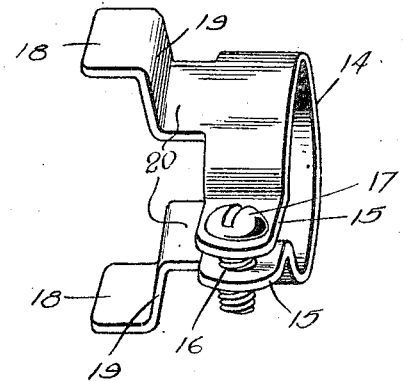
Figure 1 is a perspective view of my improved manifold nut clamp.

In the accompanying drawings, I have used the reference numeral 10 to indicate generally an exhaust manifold, which is provided with a screw-threaded end 11.

An exhaust pipe 12 is arranged to abut against the screw-threaded end of the manifold 10 and to be secured thereto by means of a nut 13.

The exhaust pipe 12 is provided with a bead or out-turned flange, so that it may cooperate with the nut 13 for holding the exhaust manifold and the exhaust pipe together.

The bead or out-turned flange on the exhaust pipe is of the ordinary construction and is not shown in the drawings.

My nut clamp consists of a split ring or collar 14, which is designed to slip onto the exhaust pipe and to be frictionally held thereon. The collar is provided with a pair of outwardly extending lugs 15, which are provided with registering openings 16, whereby a bolt 17 may be extended therethrough for securely drawing the collar 14 around the exhaust pipe 12.

The collar 14 is formed with a pair of laterally spaced ears 18. The ears 18 are connected to and formed integral with the collar 14 by means of the outwardly extending parts 19, and the laterally extending parts 20.

The nut 13 is considerably larger than the pipe 12, and it is therefore necessary to provide the outwardly extending parts 19, so that the ears 18 may be brought to position where they will engage some of the surfaces of the nut 13. The ears 18 may be formed closer together than the distance across the flats of the nut 13 and the parts 20 are therefore provided so that the ears 18 can be sprung apart for engaging the nut 13 and thus more firmly hold it even though it may be loose on the threads 11.

Figure 2:
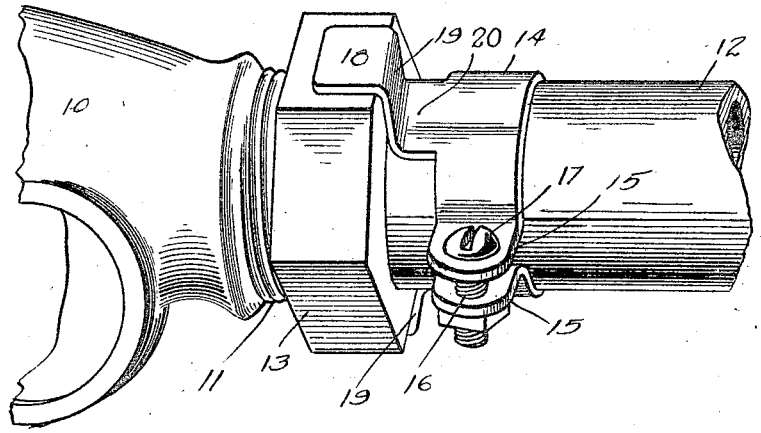
Figure 2 is a perspective view of the same showing it installed in position in combination with a manifold and exhaust pipe and the nut for connecting the same together.

The collar 14 is placed upon the exhaust pipe 12 adjacent to the nut 13, as clearly shown in Figure 2 of the drawings.

From the construction of the parts just described, it will be seen that the nut 13 will be held against any possible rotation so long as the collar 14 is frictionally held upon the exhaust pipe 12.

The laterally extending ears rest against the surfaces of the nut 13 and thereby prevent any rotation thereof.

Without the use of my manifold nut clamp, it has been found that the nut 13 often becomes loose, permitting the exhaust pipe to disconnect from the manifold or to rattle and vibrate to such an extent that it becomes a serious annoyance.

My manifold nut clamp will prevent the nut 13 from becoming loose and will do away with the necessity of trying to tighten the same for holding the manifold and exhaust pipe together when the parts are hot due to the exhaust gases of the automobile engine.

Some changes may be made in the construction, arrangement and combination of the various parts of my device, without departing from the essential features and purposes of my invention, and it is my intention to cover by my claim, any modified forms of structure or use of mechanical equivalents, which may be reasonably included within its scope.

I claim as my invention:

In combination with a manifold, having a threaded end, an exhaust pipe abutting thereagainst and a nut for holding them together, a lock for the nut comprising a single strip of metal extending around the exhaust pipe and having perforated ears at its ends, a bolt extending through said ears for clamping said strip to the exhaust pipe, a pair of ears formed on said strip of metal and extending longitudinally along said exhaust pipe, portions of said ears bent radially away from said pipe and abutting against said nut and the ends of said ears bent at right angles to said outwardly extending portions and initially spaced closer together than the width of said nut before said lock is clamped on said pipe whereby they resiliently engage the flats of said nut.

Des Moines, Iowa, August 29, 1923.

WALTER E. REILLY.